(12) United States Patent
Chidambaran et al.

(10) Patent No.: US 7,163,964 B2
(45) Date of Patent: Jan. 16, 2007

(54) METHOD FOR PREPARING AN ION EXCHANGE MEDIA

(75) Inventors: Ravi Chidambaran, Canonsburg, PA (US); Pavan Raina, Pinnac Kanchan Ganga (IN); Devesh Sharma, Washington, PA (US); Narendra Singh Bisht, Punc (IN)

(73) Assignee: Aquatech International Corporation, Canonsburg, PA (US)

( * ) Notice: Subject to any disclaimer, the term of this patent is extended or adjusted under 35 U.S.C. 154(b) by 258 days.

(21) Appl. No.: 10/687,159

(22) Filed: Oct. 16, 2003

(65) Prior Publication Data

US 2004/0168968 A1    Sep. 2, 2004

Related U.S. Application Data

(60) Provisional application No. 60/418,834, filed on Oct. 16, 2002.

(51) Int. Cl.
*C08J 5/20* (2006.01)
*B01J 41/12* (2006.01)

(52) U.S. Cl. .......................... 521/25; 521/26; 521/27; 521/28; 521/30

(58) Field of Classification Search ................ 521/25, 521/26, 27, 28, 30
See application file for complete search history.

(56) References Cited

U.S. PATENT DOCUMENTS

| | | | | |
|---|---|---|---|---|
| 3,271,163 A | * | 9/1966 | Malick | 426/271 |
| 4,931,160 A | * | 6/1990 | Giuffrida | 204/632 |
| 5,015,344 A | * | 5/1991 | Nidola et al. | 205/525 |
| 5,116,509 A | * | 5/1992 | White | 210/644 |
| 5,316,637 A | * | 5/1994 | Ganzi et al. | 204/533 |
| 5,410,672 A | * | 4/1995 | Sodek et al. | 710/52 |
| 5,858,191 A | * | 1/1999 | DiMascio et al. | 204/524 |
| 6,054,230 A | * | 4/2000 | Kato | 429/33 |
| 6,156,180 A | * | 12/2000 | Tessier et al. | 204/524 |
| 6,187,826 B1 | * | 2/2001 | Viscardi et al. | 521/26 |
| 6,248,226 B1 | | 6/2001 | Shinmei et al. | |
| 6,248,797 B1 | * | 6/2001 | Dias et al. | 521/26 |
| 6,375,851 B1 | * | 4/2002 | Sterling et al. | 210/677 |
| 6,379,518 B1 | * | 4/2002 | Osawa et al. | 204/524 |
| 6,437,010 B1 | * | 8/2002 | Viscardi et al. | 521/26 |
| 6,607,647 B1 | * | 8/2003 | Wilkins et al. | 204/523 |

(Continued)

FOREIGN PATENT DOCUMENTS

JP    04 071624 A    3/1992

(Continued)

OTHER PUBLICATIONS

International Search Report, PCT/US0332920.

*Primary Examiner*—Ling-Sui Choi
*Assistant Examiner*—M. Bernshteyn
(74) *Attorney, Agent, or Firm*—Buchanan Ingersoll & Rooney PC (57) ABSTRACT

This invention presents an ion exchange media including a plurality of cation exchange zones and anion exchange zones in flow paths that are contained in a substantially nonporous resin transport framework. During electrodeionization and other potential applications the ion exchange media of the invention prevents unfavorable water splitting at resin-membrane interfaces and encourages water splitting at resin—resin interfaces where the water splitting may be constructively used to regenerate the resin.

14 Claims, 9 Drawing Sheets

U.S. PATENT DOCUMENTS

2003/0079992 A1* 5/2003 Wilkins et al. ............. 204/523
2003/0132104 A1* 7/2003 Yamashita et al. .......... 204/252
2003/0152820 A1* 8/2003 Kato ........................... 429/33
2003/0173282 A1* 9/2003 Yamanaka et al. .......... 210/282

FOREIGN PATENT DOCUMENTS

JP     2001 079553 A     3/2001

* cited by examiner

FIGURE 1
TRANSPORT FRAMEWORK

FIGURE 2
FLOWPATH BLOCK OR DOMAIN

FIGURE 3
EXPLODED VIEW OF COMPOSITE MEDIA

FIGURE 4
COMPOSITE MEDIA READY FOR DILUTE COMPARTMENT
(SHOWN WITH RECTANGULAR BLOCK)

METHOD FOR PREPARING AN ION EXCHANGE MEDIA

CROSS-REFERENCE TO RELATED APPLICATIONS

This utility patent application claims the benefit of co-pending U.S. Provisional Patent Application Ser. No. 60/418,834, filed Oct. 16, 2002, entitled "Method for Preparing an Ion Exchange Media," having named applicants as inventors, namely Ravi Chidambaran, Pavan Raina, and Devesh Sharma. The entire contents of U.S. Provisional Patent Application Ser. No. 60/418,834 are hereby incorporated by reference into this utility patent application.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC or REFERENCE TO A "MICROFICHE APPENDIX"

Not Applicable.

BACKGROUND OF THE INVENTION

Field of the Invention

The subject invention relates to a method for preparing a composite ion exchange media for use within an electro-deionization process. This invention effectively differentiates the role of the media within the dilute compartment and describes a new method of preparation, which is able to meet the intended roles and enhance the performance.

It has been found that the media performs multiple functions involved within the dilute stream chamber. For example: ion exchange, transport of de-ionized ions collected in the dilute compartment to the concentrate the compartment. These steps have to happen at a particular rate and the kinetics are defined by the flow of water through the system and the ionic load transferred by the influent. While the flow is limited by the pressure drop through the system the ionic load is limited by the ability of the system to transport the load into the concentrate compartment and stay regenerated so that quality of water at sustained levels can be produced consistently. For each function (flow and transport) there is an optimum configuration, form, and method of preparation which cannot be achieved if there is a uniform design. If the design is uniform for the whole mass of the media, it will only perform one of the functions efficiently whereas performance on other functions will be less than optimum.

This invention involves detailed study on the mechanisms for these functions in a stepwise manner and limitations involved therein. Work has also been done to overcome the limitations through an effective combination of a media configuration, which allows handling of these functions by segregating the requirements and making them happen in an efficient manner in specific zones.

BRIEF SUMMARY OF THE INVENTION

The ion exchange media in the dilute compartment of an electro de-ionization process is required to fulfill the following two requirements.

1. Effectively exchange the ionic load being fed in through the feed water to be de-ionized; and
2. Transport the ions to the concentrate compartment while remaining in a highly regenerated form.

It is very clear through several sets of experiments that if the flux has to be maximized the media should be such that it offers minimum resistance to the flow path. However, by doing this there is a limitation in terms of the thickness because of the ability of the system to transfer ions to the concentrate compartment. This can be quickly seen in terms of deteriorating quality that needs flow to be reduced to maintain quality. This also is seen in terms of the number of the hours it takes to get the quality to a target value when the stack is started up or the stack is regenerated after exhaustion during operation.

At the same time, if the media is made of finer resin particles the ion transportation is significantly improved evidenced by the time taken to get a desirable quality but the flux achieved is not satisfactory.

Therefore, a media was invented with a combination of the two in an optimum proportion such that the ability of the media to handle flow and transport of ions within itself and through to concentrate does not limit the quality on a sustainable basis.

The media broadly consists of two parts. The porous part, which is named as Part 1 for ease of description, and the transport framework, which is named Part 2, for ease of description. There are several objectives to be kept in mind for the porous part of the media, which are as listed below:

A]. Part 1 has to be in a uniformly porous form as possible so that the water flow is possible with maximum flux. This part of the media, if reduced in size, will start offering resistance to the water flow.

B]. Part 1 of the composite media should form the bulk of the volume so that opportunity to increase the flow through the system can be maximized.

C]. Part 1 also has to stay regenerated so that efficiency of ion transport can be maintained. Therefore, the media has to remain continuously exposed to an environment where regenerating ions are available on a continuous basis.

D]. So that the objective mention in C above can be achieved all the bipolar sites have to be created on this path by design.

E]. This concept also operates on a basis that water splitting that happens on resin—resin interfaces only creates necessary regenerating ions which are efficiently utilized in the regeneration therefore eliminating any water splitting between resin membrane interfaces by design.

F]. The design of this part is done to achieve an objective of equal water distribution across the width of the media by providing flow dividers as a part of the media. Consequently, length covered by water within the media does depend on the location of the water entry within the media or difference in porosity of the media. This is therefore achieved without introduction of an inert material.

There are several objectives that need to be defined for the transport framework, Part 2, which are as follows:

A]. The main function of Part 2 of the composite media is to facilitate ion transport into concentrate compartment in a way that ion transfer is efficient into the concentrate compartment.

B]. Part 2, of the media forms a framework around Part 1 of the media, which takes flow.

C]. This part of the media does not encourage any flow because of the fine particle size it is made of and compactness of the structure. However the media can get wet and still maintain a highly conductive ion transport environment.

D]. The media of Part 2 ensures almost seamless contact with membrane ion-exchange surface on either side and also is in complete contact with the base media, Part 1. As a result, there is no channeling of water close to the membranes, which is the case in many designs. If this part is made with exhausted resin the chances of any channeling are further eliminated because of swelling of resin with regeneration that further compresses it against the membrane surface.

The Part 2 media is smooth and soft in texture and therefore almost becomes a part of membrane on one side and an extension of porous media on the other side. This is totally able to eliminate bypassing of water through the boundary layer gaps, when the resin is not fully regenerated.

E]. The media is made to have a very fine surface ensuring complete contact of the membrane and porous media surface so that there are no gaps for ion movement providing for a continuous ion exchange environment within the dilute compartment.

F]. While most of the framework is close to the membrane surface, part of this also extends to form flow defining channels for the porous media so that flow path can be maintained through the length of the media without the introduction of an inert media.

G]. The transport framework being attached to the ion exchange membrane allows the total membrane surface to be used in transport of ions across to the dilute chamber and also eliminates membrane-resin bipolar sites which reduce efficiency of transport.

H]. Minimizing and optimizing the bipolar junctions to only resin—resin bipolar surfaces thus reducing power consumption by preventing any undesirable water splitting.

DETAILED DESCRIPTION OF THE INVENTION

Keeping in mind the abovementioned requirements a media design has been created wherein a media is made with two different kind of resin configurations. An outer two part transport framework is created with fine resin (bound with a cohesive) that is capable of getting wet but is not conducive to water flow through it. However, because of close and compact configuration, it provides an efficient transport route for ions to the concentrate compartment in the direction of the driving force. This transport framework does not allow bypassing of the flow through the boundary layer because the cation and anion part of the framework is in complete contact with the respective like cation or anion membrane.

For making the framework part of the media, both varieties of resins in regenerated or exhausted form are dried at controlled temperatures and ground to reduce the size between 50–150-micron size. The ground resin is sieved to make sure larger particle size particles are positively removed. This resin is then impregnated into a binding media and it is thoroughly mixed so that it becomes uniformly distributed. It is then allowed to partially dry for sufficient time so that a dough-like mixture can be made.

Once this mixture becomes dry to an extent of a desirable level of consistency that it can be given any shape or form it is rolled or pressed into the shape of a framework depending on the design and then allowed to dry completely. The thickness of the framework can be adjusted based on the quantity and the size in terms of length and width depending on the size of the dilute compartment. This process is followed for both types of resins for either side of compartment, which is then boxed together if the dividers are made as a part of framework. If the dividers are not a part of the framework, they are internally divided by using separate dividers to create to exact shape of the Flow path zones. These Flow path zones may be called elsewhere as cation or anion zones, blocks, tablets, or domains. These are used to fill up the void spaces within the box. The overall framework is now ready to receive the second part of the media, which makes the flow path in the void space available. This design of the transport framework can be suitably created for different thickness of the dilute compartment ranging up to a thickness 14-mm or even more.

The preparation of media in the flow path, involves carefully calculating quantities of resin volumes required based on the moisture content of resin and the type of resin for a given particle size based on the bulk densities. The resin utilized, is uniform in size from 500–650 micron, and is used for the part of the media to process the flows. This resin can be bound into a different configuration using a binding agent depending on the shape and size of the longitudinal path created within the Transport framework part of the media. This shape can be based on a square, circular, rectangular or any other cross-section. This is then given the form of flow path domains. The cation and anion domains or blocks for the flow paths are of different size and can be used to fill into the void space in the frameworks in required predetermined quantities. This part of the media can also be made with dry resin, which is in a regenerated or exhausted form. Within the framework predetermined flow paths are created to guide all the flow through defined cross sections in the longitudinal direction with alternative cation and anion resin blocks or tablets. These blocks can be in a square, rectangular, cylindrical or any other geometrical shape, which facilitate ion transfer from water to resin based on the shape of the voids. The cation and anion ratio within the longitudinal flow path is adjusted to achieve the flux and bipolar surface area required, within a defined bed depth. The number of blocks are determined and adjusted based on the bipolar area required. This media is kept in bound form for ease of preparation or even can be used without any binding agent.

The binding agent can be low-density polyethylene or their mixture, natural rubber, butyl or Nitrile rubber or combinations. However best results are obtained with Nitrile rubber for both the forms of media.

Figure 5:
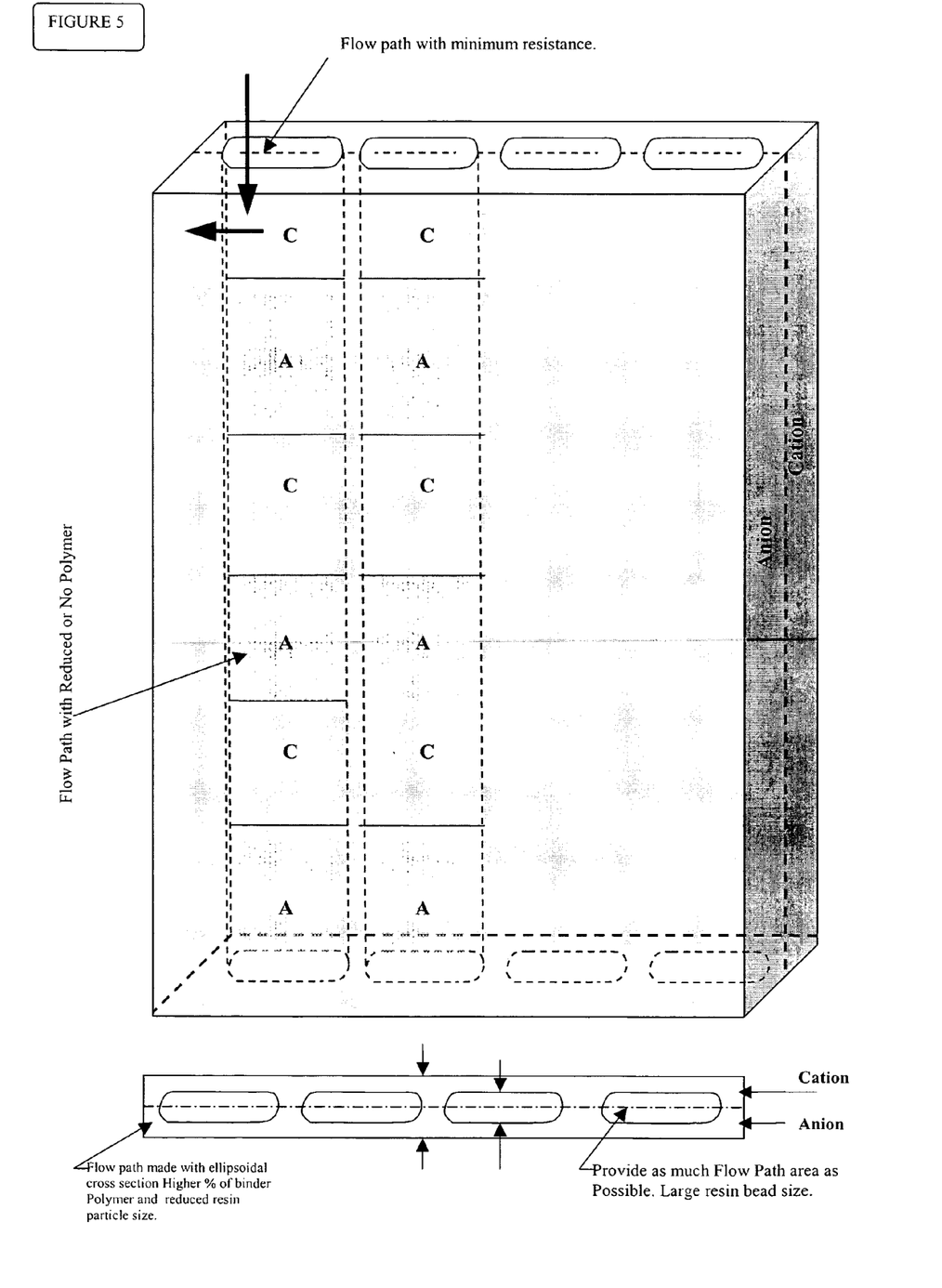
FIG. 5 includes two views of the ion exchange media of the invention.

The packing of tablets into the framework can be done in a horizontal or vertical position depending on which side of the transport framework is kept open. The box is then closed from the open end. For closing the box from the top and bottom polyester or nylon mesh is used. A composite media can be shown as given in FIG. 5.

The process of making the composite media can be devised on a manual, semi-automatic or automatic mode.

ADVANTAGES

This configuration helps in creating a design with efficient features to meet the desired intents at specific places rather than using a design, which is generally made for the overall purpose and creates disadvantages resulting from a lack of control of different steps of the process. The ability of the framework to almost seamlessly combine with both membrane and the porous part of the media is responsible for taking the flow the membranes and media act as one piece. This configuration facilitates achievement of quality immediately after starting the stack in a few hours and also helps in maintaining the quality even if the feed water quality goes through some variation in terms of hardness silica or TOC values. When the resin gets regenerated within the dilute compartment the framework further gets compacted with the membrane largely eliminating possibilities of any by-pass of flow through the membrane surface, which is possible in a conventional media and membrane system. The framework also provides a soft and continuous back up to membranes improving its mechanical strength and longevity and prevents exposure to raw resin surface, which could result in damage to the membrane surface. The process also becomes more resilient to changes in the differential pressures across the dilute and concentrate compartment. Thus the new composite media can be regenerated faster, provide consistent quality of water even with varying feed stock, offers a solution for low levels of silica and improves the mechanical strength and longevity of membranes.

EXAMPLES

The examples detailed here explain preparation of Flow path domains, blocks or tablets and Transport framework along with flow dividers. These components have been assembled together into a dilute compartment and several of these have been used to create an electro deionization assembly. Various experiments have been carried out and experimental data has been plotted in graphs.

Method of preparation of media and details of various experiments are as follows—

Experiment 1

Preparation of the Framework and Tablets

One set of die is made of the size 200×187 mm of different thickness as required for the selected size of the dilute compartment. The media was made here for dilute compartment thickness of 11.3 mm.

Anion resin in Cl form and cation in Na form resin separately dried through air or vacuum dried to reduce moisture content between 10 to 20%.

Figure 1:
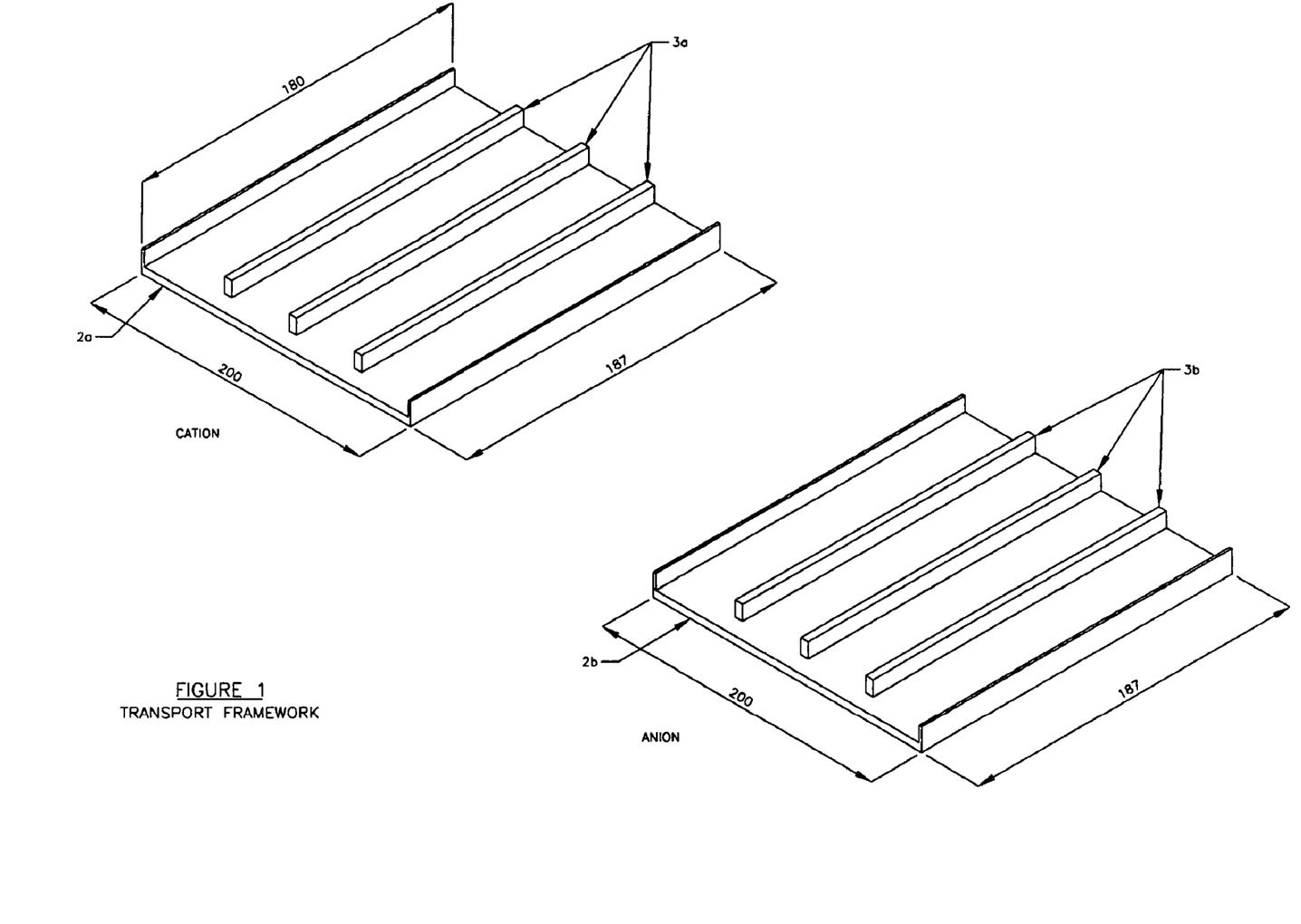
FIG. 1 is a depiction of separate cation and anion resin beds used to form the transport framework of the invention.
Figure 2:
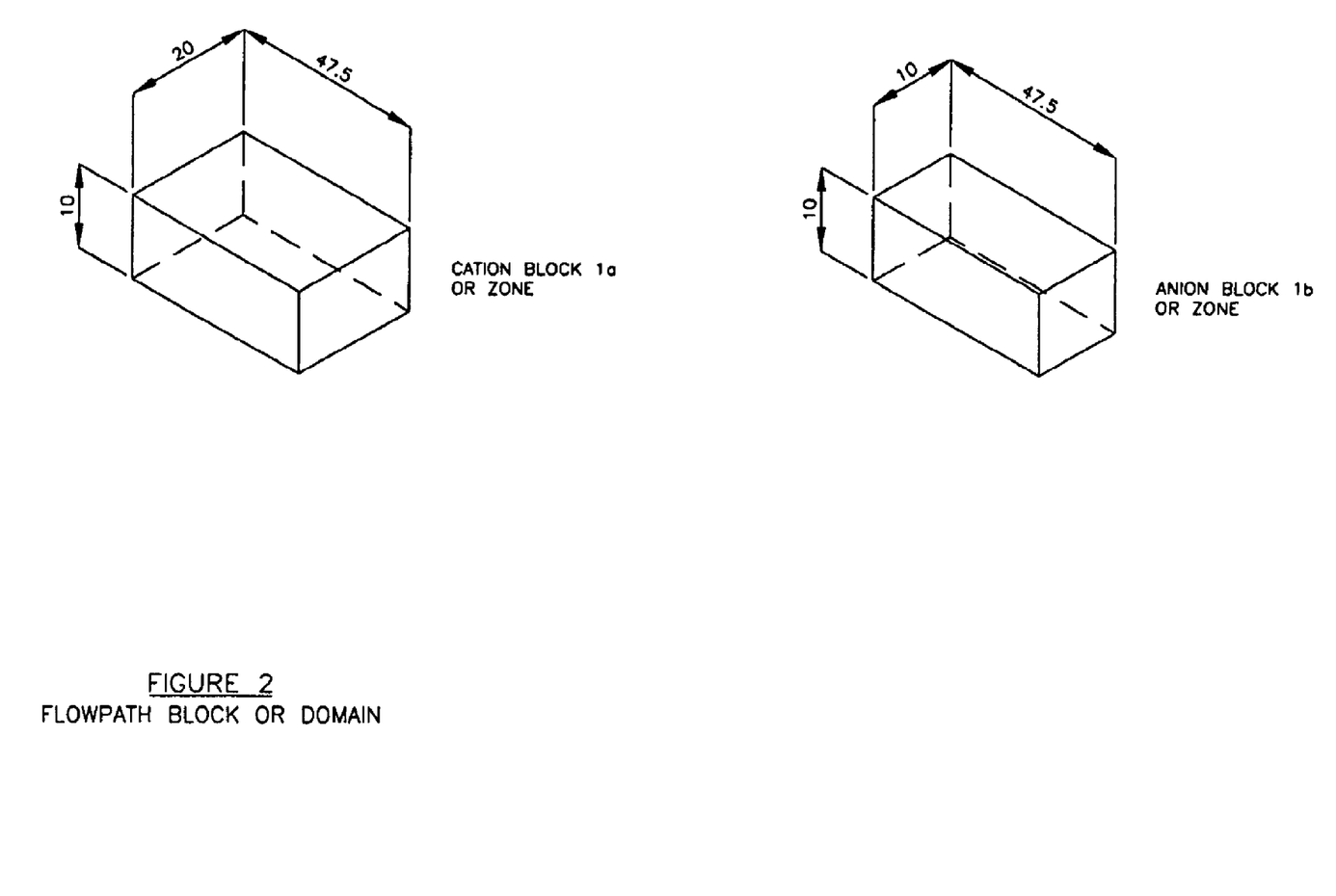
FIG. 2 depicts cation blocks and anion blocks of sizes used in one embodiment of the invention. Unites are millimeters.

As shown in FIG. 1, separate anion resin bed was made by 127 grams on 100% dry basis and blended with suitable binding agent in the range of 1% to 10% (preferably 5 to 7%). The dough was prepared filled in the die and pressed on drying. Similarly separate cation resin bed was by 169 gms of material on 100% dry basis with suitable binding agent in the range of 0.5 to 5%, (preferably between 3 to 5%). The ratio of anion and cation in one bed was kept in ratio of 35% cation and 65% anion and accordingly in the separate anion bed cation blocks that have to be cut and separated out. Under this bed example, the anion blocks size was 47.5×20 mm in the longitudinal direction and cation block size is 47.5×10 mm to give the desired proportion. These blocks are depicted in FIG. 2. In one bed there are 24 anion and 24 cation blocks. Accordingly from the anion bed separate out 24 blocks of this size and the same number from the cation block to make the bed.

Figure 9:
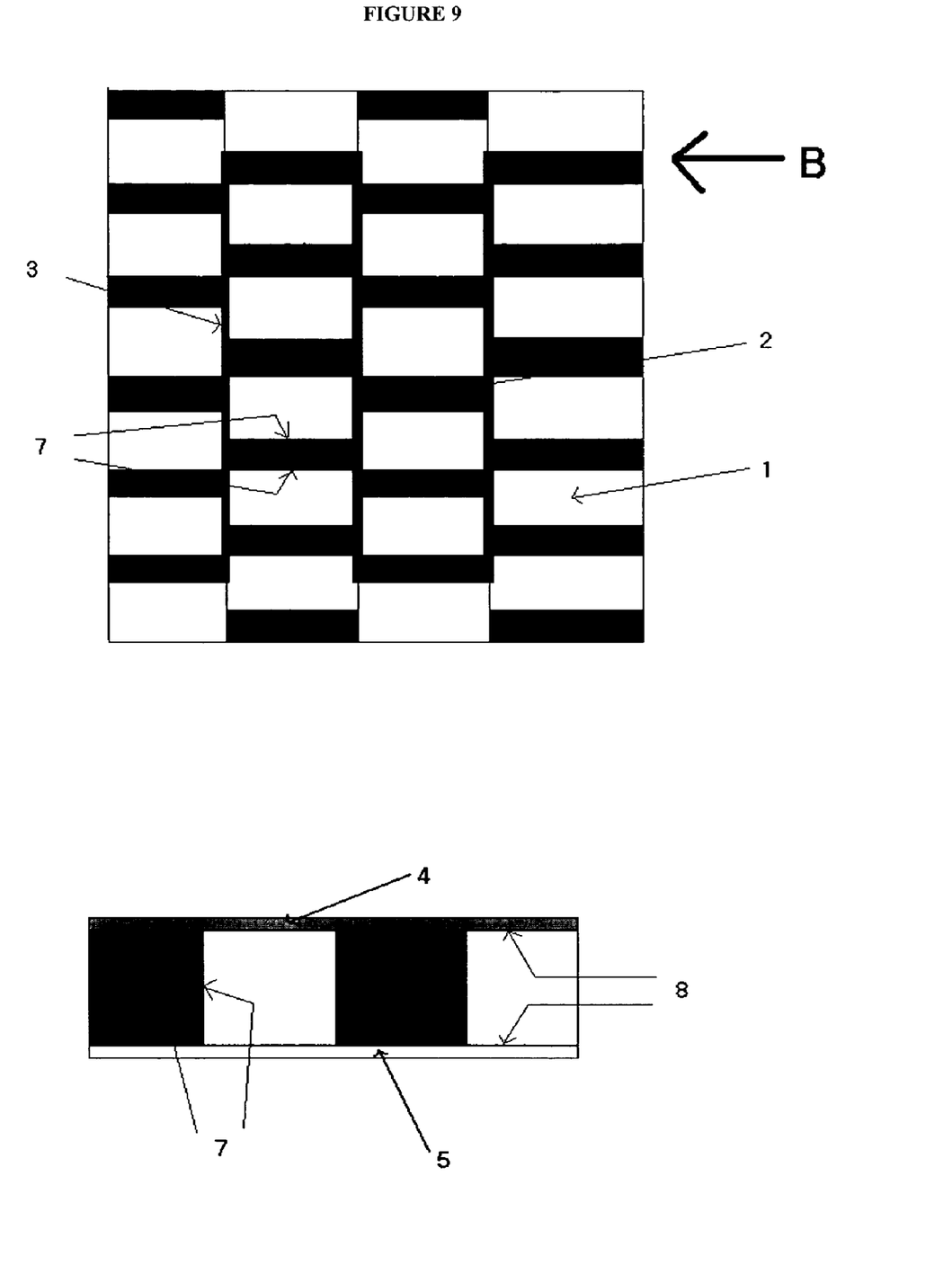
FIG. 9 presents two views of the flow paths with dividers.

Intermediate separator or divider: Air or vacuum dried anion and cation resin size was reduced and sieved to collect particle between 50 and 250 μm (preferably around 150 μm). First the sieved resin was blended with 25–50% binding agent and a sheet was prepared of 2–5 mm, preferably 3 mm thick in a die. The dried and pressed sheet was cut to 180 mm length pieces. Such 180 mm pieces were inserted in the cation bed (3a) and anion bed (3b) as shown in FIG. 1 and in FIG. 9.

Framework preparation, air or vacuum dried, ground and sieved resin of size 50–150 μm was used for the preparation of the framework. This size of resin can also be directly separated out of the resin manufacturing process from its raw materials.

As shown in FIG. 2, 17 grams of sized anion on 100% dry basis was taken and blended with 18 to 25% of a binding agent and the dough was rolled to form a layer in the thickness range of 0.5 to 1.0 mm (preferably 0.7 mm). This was allowed to dry and pressed for smoothness. Similarly 22 grams of cation resin material was taken on 100% dry basis and blended with 10 to 20% binding agent. The dough was rolled similarly as that of anion and pressed on drying to give a smooth surface of thickness between 0.5 to 1.0 mm (preferably, 0.7 mm).

Figure 3:
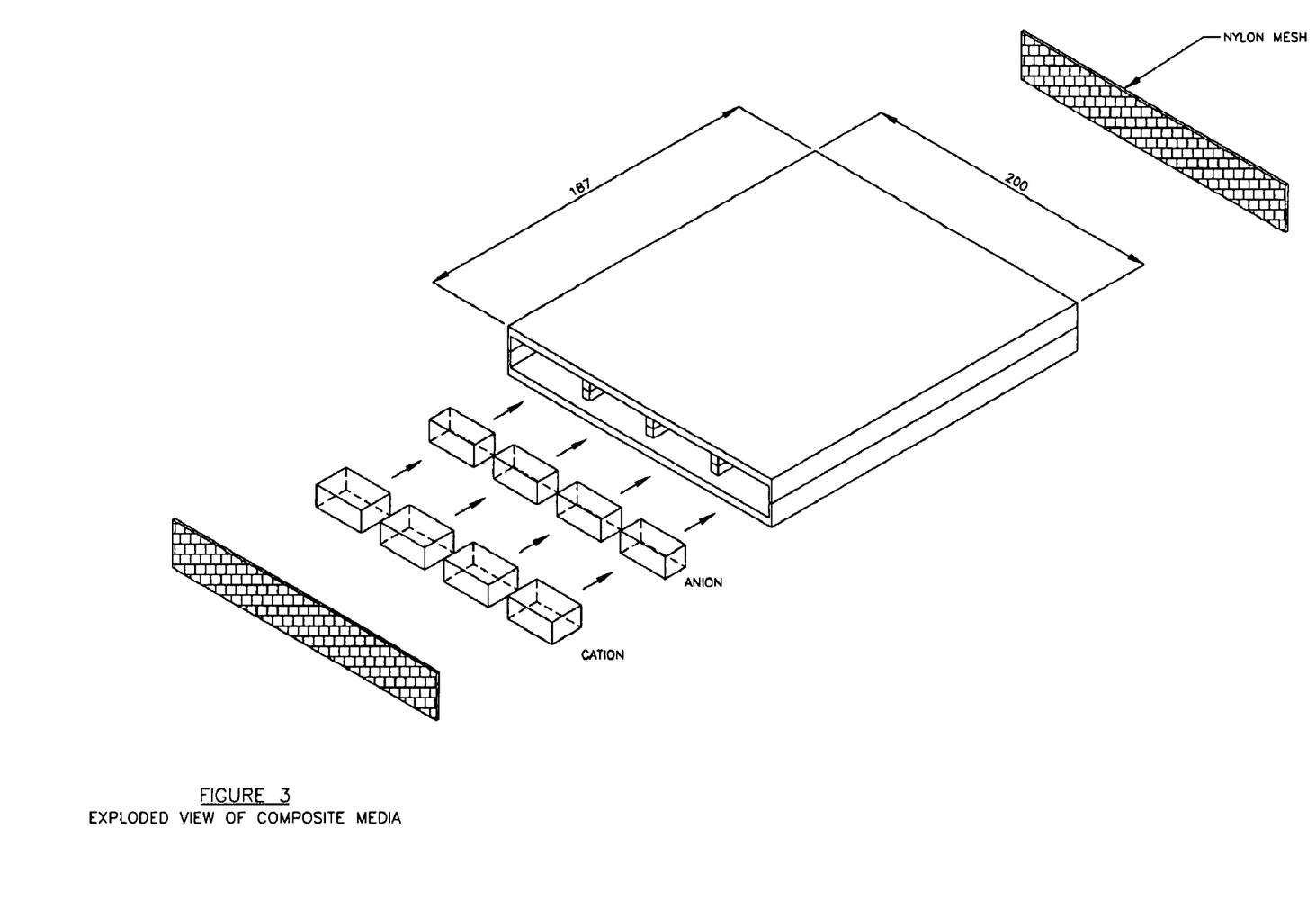
FIG. 3 is an exploded view of composite media created according to the invention. This embodiment displays four flow paths between the anion part of the transport framework and the cation part of the transport framework.

As shown in FIG. 3, the anion part of the framework and cation part of the framework were used on either side to create a box with longer dividers on either side of the framework to cover both ends of the length and in between depending on number of flow paths to be created. Alternatively these dividers can be created as a part of each framework directly from the mould. The media made under this example had four equal flow paths created with the help of three dividers of 3 mm each. Polymeric material mesh like nylon is used to cover the top and the bottom ends.

Figure 4:
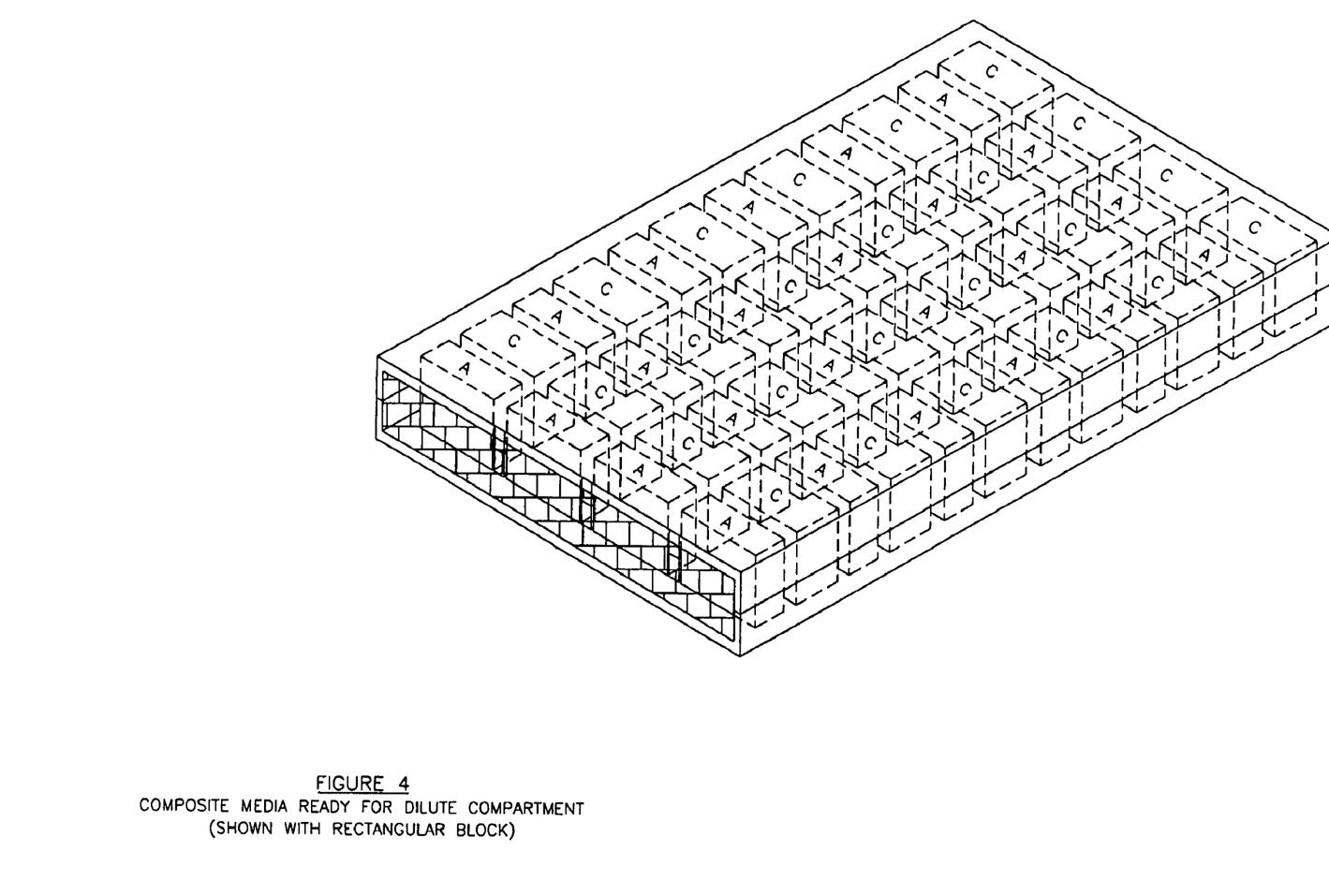
FIG. 4 is a depiction of a transport framework including four flow paths, each flow path having six cation exchange areas and six anion exchange areas.

As shown in FIG. 4, the basic framework formed was filled in with 24 each of anion and cation blocks or tablets made above. This was then kept under the influence of slight pressure so that it can be all joined together in one piece.

Six such pieces are prepared for one assembly.

Assembly: The framework filled bed was placed in the dilute compartment in such a manner that the anion part of the framework is on the anion exchange membrane side and cation portion of framework touches the cation ion exchange membrane. Assembly was then completed with the concentrate compartments and electrodes.

When the water was passed through the media for wetting the framework that was already an integral part of the remaining bed so that the framework got in close contact with the membrane thus forming a part which remains wet and prevented any chances of water to flow and through close contact with membranes accelerated the ion transfer from the remaining bed towards the membrane and into the concentrate chamber. This assembly was now ready for testing.

Before the preparation and assembly as above were done a stack was also prepared with six beds of conventional kind of media without the transport framework type beds in order to compare the base level performance with conventional type beds. These stacks had the same dilute compartments same thickness, same ratios of cation to anion resin but the base material was used to fill the thickness. The conventional bed design was based on providing cylindrical cation blocks removed from an anion bed.

The conventional stack thus operated at 120–150 lts per hour with feed condition of conductivity less than 20 μs/cm, hardness of 1 ppm and later with silica of 200 to 300 ppb. The voltage applied was of 6 to 18 v/p. The product resistivity achieved was 10 to 12 MΩcm and silica less than 20 ppb This was observed in 240 hrs of operation In the same stack six beds were replaced with the Transport framework and flow path domains type bed as per the method described as part of the invention. The stack was run with increased feed water conductivity as above with hardness of 1 ppm and silica of 200 ppb. The product quality improvement was imminent immediately. The flow through the system increased by 25–30% at a sustained level of quality of 16–18 MΩcm. This configuration continued to perform for more than 500 hrs.

Figure 6:
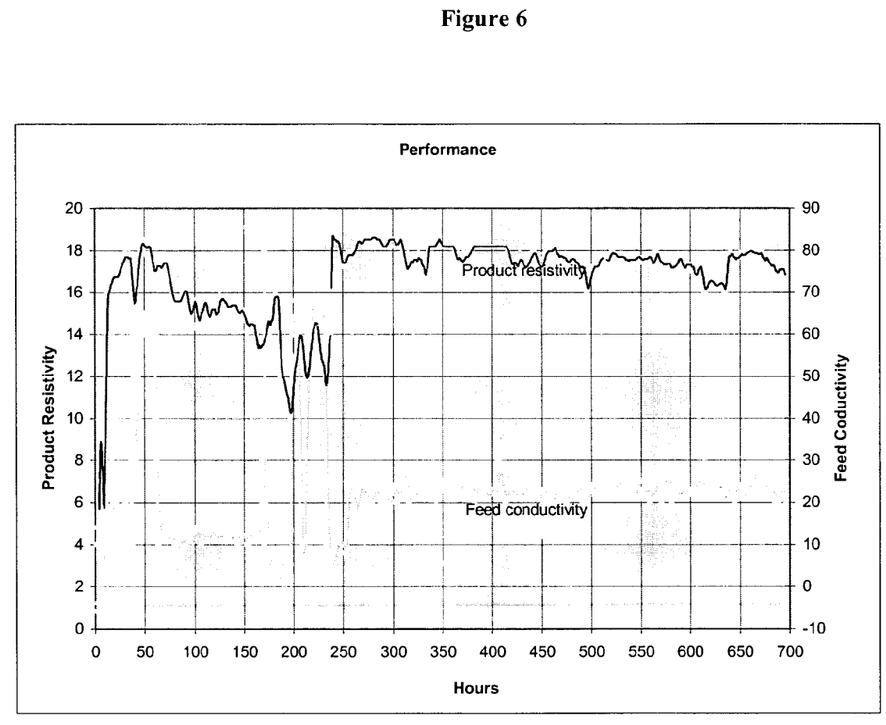
FIG. 6 is a graphical representation of product resistivity over time for an electrodeionization stack run without the benefit of the ion exchange media of the instant invention.

As seen in FIG. 6, the stack was run first for 240 hrs with a conventional bed and without the transport framework type bed. The stack stabilization took approximately 40 hours initially to achieve product resistivity of greater than 17.5–18 MΩcm. Silica was then added equivalent to 200 ppb in the feed. Product resistivity started slipping down gradually as shown in FIG. 6.

The stack beds were then replaced with frameworks type beds, which are part of the invention. Product resistivity of 18 MΩcm was achieved within 15–20 hours and sustained around that level for next 450 Hrs of operation of this experiment.

Experiment 2

Thickness of the dilute compartment used was 10.7 mm. Anion resin in Cl form and cation in Na form resin separately air dried to reduce moisture content between 10 to 20%. Separate anion resin bed is made by 125 grams on 100% dry basis and blended with suitable binding agent in the range of 1% to 10% preferably 5 to 7%. The dough is prepared filled in the die and pressed on drying. Similarly separate cation resin bed is by 165 gms of material on 100% dry basis with suitable binding agent in the range of 0.5 to 5% preferably between 3 to 5%. The ratio of anion and cation in one bed was kept the same as experiment-1. The anion and cation blocks were also of the same size. Intermediate separator and the framework preparation were similar as in experiment-1 but adjusted to suit the thickness of dilute compartment.

All the six beds at this time were having transport framework and flow path domains when the assembly of the stack was done. The stack operated with feed condition of Conductivity of 20 μs/cm, hardness of 1 ppm and silica of 200 ppb. The voltage applied was of 4 and 16 v/p. The product achieved was of 18 MΩcm and silica less than 10 ppb on sustainable basis for more than 500 hrs of operation.

Figure 7:
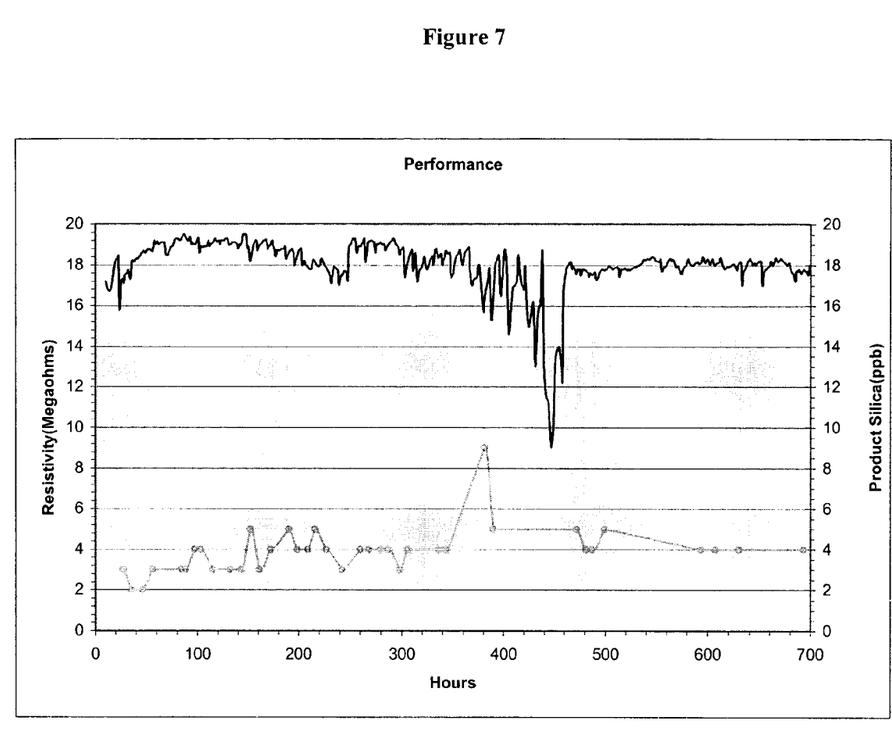
FIG. 7 is a graphical representation of product resistivity over time for an electrodeionization stack including in its dilute compartment the ion exchange media of the invention.

As seen in the FIG. 7, this stack was run with the feed of conductivity of 20 μs/cm and silica of 200 ppb. Within first 15 hrs the stack was stabilized and the product resistivity stayed around 18 MΩcm and product silica below 6 ppb through out the run of 700 hrs. This stack feed was also subjected with contamination of TOC between 220 and 440 hrs without the degradation in the product.

It is also seen in FIG. 7, there is a dip in the product after 440 hrs, where the bed was exhausted by design to see its ability to regenerate again and give low levels of silica. And it can be seen it was able to regenerate to the original levels of quality of 18 mega ohms within a period of 15–20 hours of operation while continuing to operate with a feedstock of a conductivity of 20 μs/cm. It was also able to deliver silica quality of less than 5 ppb. The assembly was tested for 700 hours.

Experiment 3

To confirm results on a larger assembly a 30 cell pair stack was made with the media with framework as described above. The RO product was fed to an EDI stack. The assembly was tested for product quality and silica concentration.

The operating conditions were as follows: Feed flow 1.6 M³/hr at 2.5 kg/cm2 pressure, Feed conductivity in the range of 5 to 15 μs/cm, pH of 5.5 to 6.5, Feed silica of 150 to 200 ppb, applied voltage 10 to 15 v/p and ampere consumed 2+/−0.2 amps.

Figure 8:
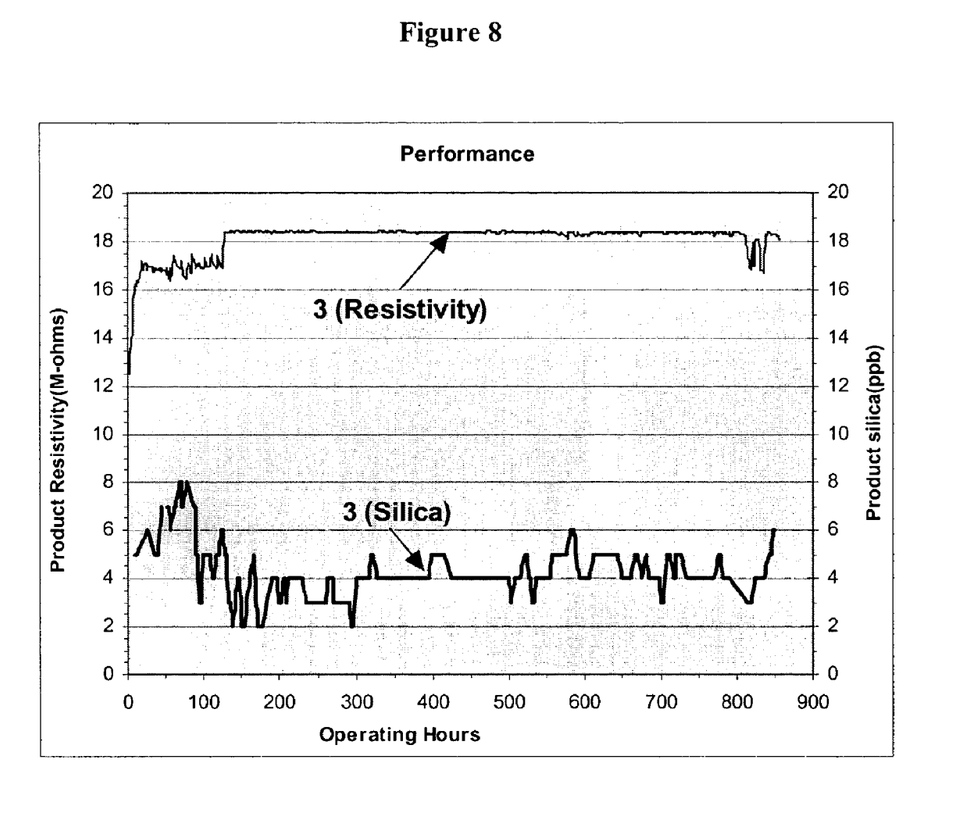
FIG. 8 is a graphical representation of product resistivity over time for a thirty cell-pair electrodeionization stack including in its dilute compartment the ion exchange media of the invention.

The product resistivity maintained above 18 MΩcm throughout the experiment. The assembly was able to regenerate within 15–20 hours after it was started. The product silica was observed less than 5 ppb with silica going as low as 2 ppb. In the data of 800 hours of operation confirms sustained results. The results are presented in FIG. 8.

Obviously, many modifications and variations of the present invention are possible in light of the above teachings. It is therefore to be understood that, within the scope of the appended claims, the invention may be practiced otherwise than as specifically described.

We claim:

1. An ion exchange media comprising nonporous resin transport framework, said framework comprising a cation resin side and an anion resin side, wherein said sides are opposite each other and meet at least two interfaces; said cation resin side and said anion resin side defining at least one flow path.

2. The ion exchange media of claim 1, wherein cation resin and anion resin are contained within the flow path.

3. The ion exchange media of claim 2, wherein the resin comprising the resin transport framework and the resin within the flow path may be regenerated resin, exhausted resin, or a combination of the two.

4. The ion exchange media of claim 2, wherein the average particle size of the resin comprising the resin transport framework is smaller than the average particle size of the resin within the flow path.

5. The ion exchange media of claim 2, further comprising least one of an anion membrane and a cation membrane, wherein said cation membrane is in contact with the cation resin side of the framework and said anion membrane is in contact with the anion resin side of the framework.

6. The ion exchange media of claim 5, wherein said anion membrane is in continuous contact with said anion resin side, and wherein said cation membrane is in continuous contact with said cation resin side.

7. The ion exchange media of claim 1, wherein said resin transport framework prevents movement of water through said resin transport framework outside the boundary of the flow path when said resin transport framework is in the dilute chamber of an electrodeionization apparatus.

8. The ion exchange media of claim 2, wherein said resin transport framework is comprised of a binding agent and said flow path is comprised of a binding agent, and wherein the concentration of said binding agent in said resin transport framework is greater than the concentration of said binding agent in said flow path.

9. The ion exchange media of claim 8, wherein the respective binding agents may be the same binding agent, different binding agent, or a mixture of the same binding agent and different binding agent.

10. The ion exchange media of claim 8, wherein said resin transport framework is comprised of a first binding agent with a first porosity, wherein said flow path is comprised of a binding agent with a second porosity, and wherein said second porosity is greater than said first porosity.

11. An ion exchange media comprising a nonporous resin transport framework comprised of an anion resin side and a cation resin side that meet at at least one interface, said anion resin side and said cation resin side defining at least one flow path, said flow path comprising alternating areas of cation resin and anion resin in contact with said nonporous resin transport framework.

12. A method for limiting water splitting to resin—resin bipolar interfaces during electrodeionization of water, comprising limiting flow of water in a dilute chamber between an anion membrane and a cation membrane to a flow path, said flow path comprising alternating cation resin zones and anion resin zones contained within a nonporous resin transport framework comprising an anion resin side and a cation resin side, wherein the anion resin side is interposed between the resin zones and the anion membrane and wherein the cation resin side is interposed between the resin zones and the cation membrane.

13. The ion exchange media of claim 1, wherein said nonporous resin framework surrounds said flow path.

14. The ion exchange media of claim 1, wherein said nonporous resin transport framework does not come within the flow path.

* * * * *

UNITED STATES PATENT AND TRADEMARK OFFICE
CERTIFICATE OF CORRECTION

PATENT NO. : 7,163,964 B2  Page 1 of 1
APPLICATION NO. : 10/687159
DATED : January 16, 2007
INVENTOR(S) : Ravi Chidambaran et al.

It is certified that error appears in the above-identified patent and that said Letters Patent is hereby corrected as shown below:

Column 9, claim 5, line 10, delete "least one of".

Signed and Sealed this

Tenth Day of April, 2007

JON W. DUDAS
*Director of the United States Patent and Trademark Office*